Figure 1:
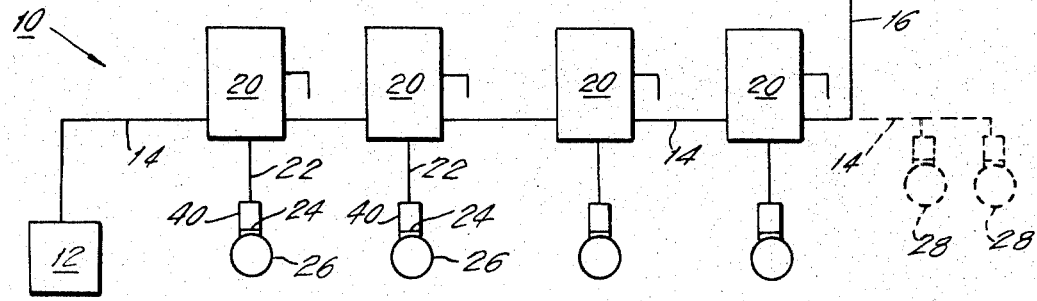

United States Patent [19]
Colgan et al.

[11] 3,730,297
[45] May 1, 1973

[54] LIQUID SYSTEM FUNCTION INDICATOR

[75] Inventors: Francis E. Colgan, Midland Park; Paul H. Reeve, River Vale, both of N.J.

[73] Assignee: Auto Research Corporation, Boonton, N.J.

[22] Filed: July 28, 1971

[21] Appl. No.: 166,721

[52] U.S. Cl. ..................... 184/6.4, 137/557, 184/7 D
[51] Int. Cl. .............................................. F16n 29/04
[58] Field of Search .................. 184/6.4, 7 R, 7 D, 184/7 E, 7 F, 1 C; 137/312, 557, 556; 340/270, 242

[56] References Cited

UNITED STATES PATENTS

| | | | |
|---|---|---|---|
| 3,098,500 | 7/1963 | Gruber | 137/556 X |
| 2,691,773 | 10/1954 | Lichtenberger | 340/242 |
| 3,038,557 | 6/1962 | Callahan | 184/7 D |
| 3,526,297 | 9/1970 | Rotter et al. | 340/270 X |
| 3,500,960 | 3/1970 | Jaggi | 184/7 F |

Primary Examiner—Manuel A. Antonakas
Attorney—Sidney G. Faber et al.

[57] ABSTRACT

In a constant volume liquid distribution system, a means to determine which liquid outlet means in a series of outlet means connected with a main pressure line is not receiving its proportional share of liquid. This is accomplished by monitoring the relationship of a primary and a secondary pressure within some acceptable limits to detect any malfunction in the system. Each outlet means includes a branch pressure line connected with the main line and passing through a proportioning block. Each block includes a pressure responsive valve means that monitors the aforementioned pressure relationship and operates as a result of varying pressures within the block due to malfunctions anywhere between the main line and the outlet from the respective outlet means. Valve operation causes a malfunction indicator for the same block to operate. Each block includes appropriate pressure and flow control fittings for apportioning liquid among the outlet means.

20 Claims, 3 Drawing Figures

Patented May 1, 1973

3,730,297

INVENTORS
FRANCIS E. COLGAN
PAUL H. REEVE

BY Ostrolenk, Faber, Gerb & Soffen
ATTORNEYS

LIQUID SYSTEM FUNCTION INDICATOR

The present invention relates to a liquid distribution system function indicating means for indicating whether the system is operating properly and for indicating the location of any malfunction in the system. This is accomplished by monitoring the relationship of a primary and a secondary pressure in the system within some acceptable limits to detect any malfunction in the system. The invention is preferably used with a constant volume system which dispenses a predictable volume of liquid over time regardless of any blockages, leaks, pressure variations, etc. Because volume remains constant, the variable pressure becomes a useful malfunction indicator.

In a specific application, the present invention is used in conjunction with a liquid lubricant pumping system. Hereafter only liquid lubricant will be mentioned, but other appropriate liquids may be used.

One type of constant volume lubricant distribution system employs a single pumping apparatus that feeds a main pressure line. Each of a series of branch lines connected to the main line feeds a respective outlet to deliver an apportioned share of the total lubricant flow to a respective bearing, or the like. In the event of a malfunction in a branch line or outlet, the remainder of the system will continue to operate properly, while the malfunctioning section will deprive its respective bearing of needed lubricant, which may cause needless damage. If the pumping system is automatic and unattended or if the entire system is quite large, the malfunction in a single branch line or outlet may not be noticed for a long time. Appropriate means is required to alert an operator of the occurrence of a malfunction and to provide an indication as to the precise location of the malfunction within the system.

In the prior art, sequential or cascading lubricant distribution arrangements are used to provide indications of proper system operation and to pinpoint where malfunctions have occurred. See, for example, U.S. Pat. No. 3,500,960, issued to Robert H. Jaggi, on Mar. 17, 1970, entitled "Central Lubricating System of the Sequentially Operating Piston Valve Type," and assigned to the assignee hereof. Each discharge outlet dispenses lubricant received from a dispensing block. The block includes a piston that is shifted to discharge lubricant. Only as each piston shifts is the succeeding piston enabled to shift. If the pressure indicator at the end of the series of pistons indicates completion of the cycle, it is assumed that all pistons have shifted and properly dispensed lubricant, when this might not be the case. With the present invention, on the other hand, such an assumption is not required as each individual dispensing block separately indicates the occurrence of a malfunction.

The above described prior art system is not sufficiently sensitive to a minor leak in a dispensing block. The reduced system pressure resulting from the leak would still be sufficient to shift the pistons and permit completion of a cycle, although at least one of the discharges of lubricant was insufficient. To cure this, the cycle completion sensing switch can be made sufficiently sensitive to detect even a small pressure deviation. However, oversensitivity may cause sensing of nonexistent malfunctions or of minor leaks that would have insignificant effect by the time a cycle is completed. The present invention enables sensitive malfunction indication without oversensitivity.

Furthermore, a cascading system frequently does not provide an indication for each branch line leading to each outlet as to where the malfunction has occurred, often because of the expense of such an installation. With the present invention, malfunction indication on each branch line is readily obtained.

In addition, a cascading or sequential system necessarily dispenses lubricant cyclically or periodically. Each dispensing piston cannot shift until all preceding pistons in the line have shifted. With the present invention, as will become apparent below, continuous lubricant distribution is possible.

The present invention employs a main lubricant carrying pressure line. Each of a plurality of branch pressure lines leads from the main pressure line to an individual proportioning outlet through a respective proportioning block. Within the proportioning block and in the branch line is located a primary lubricant flow control fitting, which serves as a first control on the rate of flow of lubricant through the outlet. Further downstream on the branch line, and preferably just upstream of its proportioning outlet, is positioned a secondary flow control fitting, which provides additional flow rate control. The primary and secondary flow control fittings cooperate to apportion the lubricant flow through their respective outlet. Because the present system is a constant volume one, the invention concerns sensing the pressure between the primary and secondary fittings in each block to locate a malfunction.

A primary malfunction indicating assembly communicates between the primary and secondary flow control fittings in a block. That primary assembly includes a sensing means connected with the main pressure line such that upon a reduction in the pressure between the aforesaid primary and secondary fittings, as compared with the pressure in the main pressure line, an indicator device will be actuated. That indicator device comprises a primary valve, including a shiftable valve spool, e.g., a piston, which on one side is operated upon by the pressure in the main pressure line and on the other side is operated upon by the pressure between the primary and secondary fittings. A spring cooperates with the pressure between the fittings to retain the valve in the position that indicates proper function. A reduction in the pressure between the fittings occurs when there is a malfunction or blockage upstream of or in the primary fitting and upstream of the connection of the primary assembly between the fittings or when there is a leak anywhere along the branch line.

Also communicating between the fittings is a secondary malfunction indicating assembly, which operates in the event of certain malfunctions to open the primary valve and permit the above noted malfunction indicating leakage. The secondary assembly comprises a second indicating valve with a shiftable valve spool, e.g., a piston.

If there is a malfunction or a blockage in the secondary fitting or in the branch line between the proportioning outlet from the branch line and the primary fitting, there is a decrease in the flow of lubricant through the outlet from the branch line and a consequent increase in the pressure between the fittings. Eventually, this pressure build-up causes the secondary valve to open, which immediately reduces the pressure behind the primary valve. The primary valve opens due to the reduction in pressure behind it.

A volume absorber, which may comprise a spring biased spool, e.g., a piston, also communicates between the fittings. The volume of the space between the fittings that is available to hold lubricant, and therefore the volume of lubricant between the fittings remains substantially constant over an extended period of time. The only outlet from this space is the slow leakage past the secondary fitting. When the primary valve shifts due to a malfunction, this would reduce the space between the fittings. However, since the volume of that space must remain constant, the primary valve would not be able to shift unless the volume absorber also shifts to permit the primary valve to shift.

It is the primary object of the present invention to provide an effective lubricant distribution system for a number of proportioning outlets supplied by a single lubricant pressure source.

It is another object of the present invention to provide such a system with means for indicating a malfunction in the main pressure line and in each branch line leading to each proportioning outlet.

It is still another object of the present invention to provide such a system which is quite sensitive.

It is yet another object of the present invention to provide such a system, which can proportion lubricant continuously.

Figure 2:
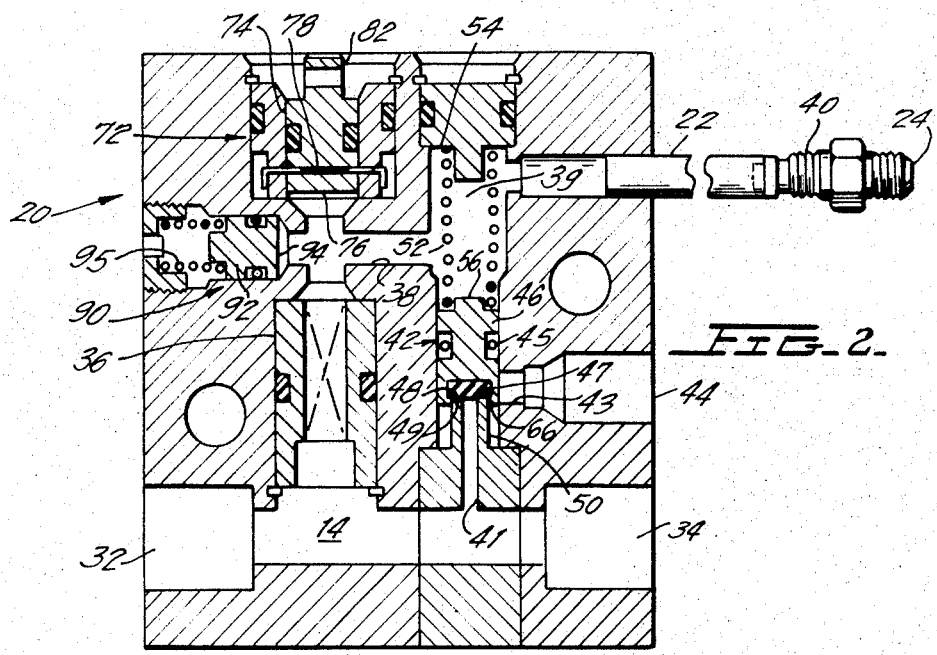
Figure 3:
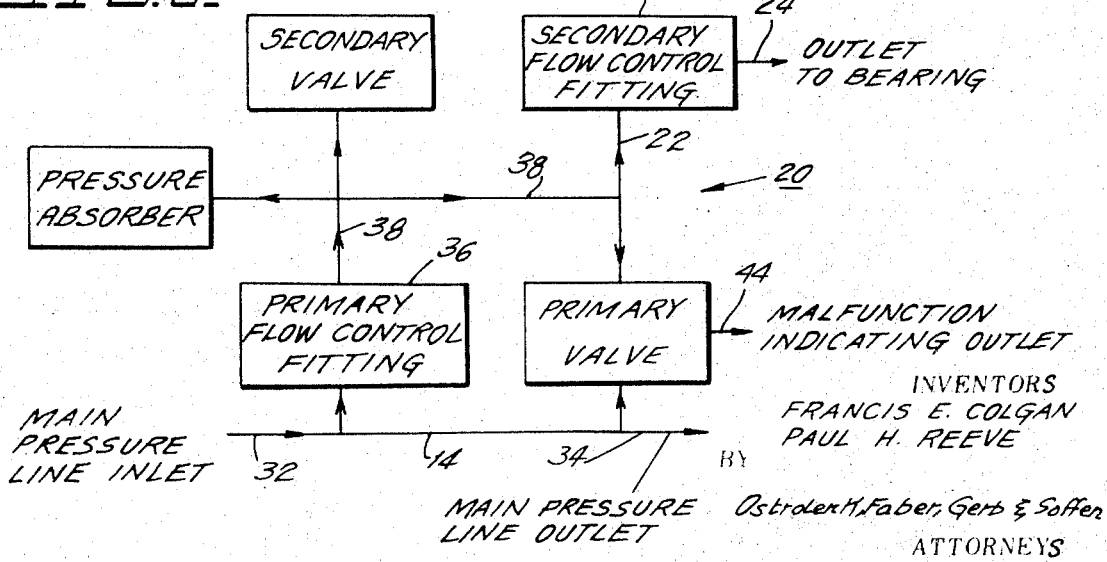

These and other objects of the present invention will become apparent from the following description of the accompanying drawings, in which:

FIG. 1 schematically illustrates a lubricant distribution system employing the present invention;

FIG. 2 is a cross-sectional view through a dispensing block for use in conjunction with the present invention; and FIG. 3 is a schematic diagram of the dispensing block of FIG. 2.

FIG. 1 shows a centralized lubricant distribution system 10 of the type taught in U.S. Pat. No. 3,499,506, issued Mar. 10, 1970, to William E. Durnan and Paul H. Reeve, entitled "Lubricant Distribution System, et al." and assigned to the assignee hereof. The system includes a supply of lubricant, such as oil, and a pump 12. Pump 12 may supply lubricant under pressure continuously or periodically as a particular application requires.

The lubricant is pumped through main pressure line 14, which passes through all of proportioning blocks 20, described below. At the end of line 14 is connecting conduit 16 which communicates with pressure sensing switch 18. Switch 18 might be a flow sensor which measures the rate of lubricant flow. In the event of any unusual change in the pressure in main line 14, which would occur, for example, when pump 12 is shut off, or line 14 is crimped or blocked, or there is a major leak in the system, then switch 18 actuates a signal that there is a malfunction in one of the above noted elements of the system.

Situated on line 14 are a plurality of substantially identical proportioning blocks 20, each of which transmits an apportioned share of lubricant through its respective branch pressure line 22 and its respective proportioning outlet 24 to respective bearing 26 requiring lubrication.

Pressure line 14 may also directly deliver lubricant, without using proportioning blocks, like 20, to non-critical bearings 28 where there is little danger of damage resulting from a malfunction in the system or in the distribution of lubricant to these bearings. The connections for delivering lubricant to such bearings are illustrated in dashed line form in FIG. 1.

In FIGS. 2, and 3, a typical proportioning block 20 is illustrated. Main pressure line 14 is connected with and passes through block 20 from main pressure line inlet 32 through main pressure line outlet 34. The normal flow path through block 20 of an apportioned share of lubricant is from inlet 32 into the branch pressure line, meaning that it passes through primary flow control fitting 36, pressure sensing conduit 38, secondary sensing conduit 39, branch pressure line portion 22, and secondary flow control fitting 40 through outlet 24 at the end of line 22. For best malfunction indication, as described below, secondary fitting 40 is usually located remote from block 20 itself, rather than in the block, as as near as possible to outlet 24.

Both of the primary and secondary flow control fittings are standard and include an appropriately dimensioned opening to control flow. In a continuously operating system, both of the fittings merely control the rate of flow. In a cyclic system, the secondary fitting 40 is of the type which includes its own internal valve that inhibits lubricant backflow and air leakage when lubricant is not being pumped, such as that taught in U.S. Pat. 2,810,541, issued Oct. 22, 1957 to Thomas R. Thomas, entitled "Flow Metering Unit," and assigned to the assignee hereof.

As lubricant passes primary fitting 36, there is a first pressure drop. As it passes secondary fitting 40 and exits from the system, there is a second pressure drop to zero. The flow resistances of fittings 36, 40 may be in any proportion. In the preferred embodiment of the invention, the flow resistances of fittings 36 and 40 are equal so that the pressure in conduit 38 is half that in main line 14.

Main line 14 communicates through narrowed conduit 41 with valve 42. Conduit 38 also communicates with valve 42. When the pressure in conduit 38 drops below a threshold level, valve 42 opens a leakage flow of lubricant from conduit 41, which passes through passage 43 and outlet 44 where it serves as an indication as to where a system malfunction has occurred.

Valve 42 includes a pressure change reacting means, a spool, piston 46 that moves through bore 45. Piston 46 includes a stiffly resilient valve element 47, of rubber or the like, which is at the lower end of piston 46. Its lower surface 48 is biased against flattened valve seat 49. Seat 49 comprises the free upper edge of a rigid metal annular sleeve 50 which has an opening through it that is included as part of conduit 41. Surface 48 of valve piston 46 must readily seal against seat 49 at the operating pressures of the system. The seal must be secure not only at the elevated pressures where a malfunction is being sensed, but frequently at the greatly reduced pressures of an operating lubricating system. These differing pressure levels are discussed further below.

Main pressure line 14 communicates through connecting conduit 41 with the lower surface 48 of piston 46. Compression spring 52 seats at one end against fixed spring seat 54 and at the other end presses against surface 56 of piston 46 to normally drive the piston against seat 49.

Since conduit 41 is narrowed at seat 49, the area of surface 48 that is defined by seat 49 to be exposed to the main line pressure is quite small. The other, upper surface 56 of piston 46 is larger than the small area of surface 48 that is exposed to conduit 41. Surface 56 is exposed to the reduced level of pressure in conduit 38. The pressure on surface 56 combines with the force exerted by spring 52 to hold piston 46 against seat 49. When piston 46 shifts upward in FIG. 2 off seat 49 upon the occurrence of a malfunction, as described below, an enlarged chamber is formed beneath surface 48 within bore 45. Immediately, the elevated pressure within conduit 41 is applied upon a greater area of surface 48 and helps drive piston 46 rapidly upward against the force of spring 52 and the pressure in conduit 38.

The periphery of piston 46 serves as a blocking means to close conduit 43. When piston 46 eventually shifts upward sufficiently, lower edge 66 of the piston opens malfunction indicating outlet conduit 43. Lubricant from line 14 leaks through conduits 41, 43 and outlet 44. This leakage indicates the location of the malfunction.

In the event of other types of malfunctions in block 20, instead of dropping below a first threshold level, the pressure in conduit 38 increases beyond a second threshold level. This holds valve 42 closed. But, conduit 38 also communicates with secondary valve 72, which includes its own reacting means that opens upon sufficient elevation of the pressure in conduit 38. Opening of valve 72 causes an immediate drop in the pressure in conduit 38 below the first threshold level. This causes piston 46 to shift which, through the chain of events described above, causes leakage through outlet 44 and locates the malfunction.

Secondary valve 72 includes a reacting means, a spool, piston 74, the lower surface 76 of which communicates directly with pressure conduit 38. Normally a spool valve, like valve 72, would have some degree of sponge or preshifting in its stationary original position. This undesired momentary shifting of piston 74 might undesirably reduce the pressure in conduit 38. Since the operation of primary valve 42 is triggered by shifting of piston 74, piston 74 should be held rigidly stationary until an abnormal condition develops that should cause it to shift. Restraining means 78 holds piston 74 rigidly stationary in its primary position. Restraining means 78 comprises a shearable burst disc or a shearable metallic wire, or the like, having known burst strength. The wires of a typical restraining means 78 pass through closely dimensioned openings in piston 74 and closely dimensioned openings in the cylinder walls surrounding piston 74. The restraining means wire has sufficient rigidity to hold piston 74 stationary. When the pressure in conduit 38 exceeds the second threshold level, the force on piston 74 is sufficient to tear restraining means 78 and permit piston 74 to jump outward, i.e., upward in FIG. 2. The free end 82 of piston 74 may be so shaped and positioned with respect to the casing of block 20 as to extend out of the block when piston 74 shifts upward. This will provide an indication that the malfunction is one resulting from overpressure in conduit 38. As noted above, when piston 74 shifts, the sudden pressure reduction in conduit 38 results in opening of valve 42.

Before piston 46 shifts, conduit 38, branch line 22 upstream of fitting 40 and the rest of the space between fittings 36, 40 is filled with liquid. While the liquid is at a lower pressure than that in main line 14, it is still incompressible, whereby piston 46 would be prevented from ascending, in FIG. 2, because there would be no space for it to move into. The slow bleed of pressure and liquid through fitting 40 is insufficient to absorb the necessarily rapid movement of piston 46. Conduit 38 also communicates with a volume absorber 90, which includes a spool, piston 92 having a surface 94 exposed to the pressure in conduit 38. A shift in the lubricant in conduit 38 due to movement of piston 46 causes piston 92 to shift to the left in FIG. 2. Spring 95 presses piston 92 inward, i.e., to the right in FIG. 2. The spring permits piston 92 to be continuously shifting gradually under varying volumes developed within conduit 38. When lubricant is displaced by movement of piston 46, piston 92 shifts to keep constant the volume of the space available for the trapped liquid. Piston 92 shifts quite rapidly when piston 46 is moving. Preferably, the area of surface 94 is equal to that of surface 56, so that piston 92 shifts to the same extent as piston 46.

Block 20 operates as follows. In the event that there are no blockages, leaks or malfunctions in the system, lubricant will properly flow through the desired pathway and outlet 24 without either of valves 42 or 72 being affected. In the event of blockage, crimping, a leak or other malfunction in main pressure line 14, the change in pressure in that line would be sensed at pressure switch 18.

In the event of a blockage in or a malfunction of primary flow control fitting 36 or upon the occurrence of other events noted above, the pressure in conduit 38 and on surface 56 of piston 46 declines. Spring 52 alone is then insufficient to hold valve piston 46 closed, the valve opens, and the leakage through outlet 44 indicates the precise location of the malfunction.

In the event of a blockage in or a malfunction of secondary flow control fitting 40 or upon the occurrence of other events noted above, the flow through fitting 40 declines. Since there is a reduction in the pressure drop across fitting 40, the pressure in conduit 38 correspondingly rises. The elevated pressure on surface 56 of valve piston 46 prevents shifting of the piston. Increasing pressure will eventually cause valve 72 to open, which, as described above, thereafter causes valve 42 to open and causes the malfunction indicating flow of lubricant through outlet 44. Thus, no matter what type of malfunction occurs in the system, it will be indicated.

As noted above, secondary flow control fitting 40 is located as close to outlet 24 as possible. As described herein, any malfunctions in that fitting or upstream thereof will, therefore, be reflected in the malfunction indication provided by block 20. If secondary fitting 40 were included in or close to dispensing block 20, then all of the length of outlet conduit 22 downstream of that fitting might not receive the benefit of the malfunction indication which the present invention is designed to provide.

Were the system pressure in main pressure line 14 sufficiently high, the system would be continuously testing itself for malfunction and continuously indicating the precise location of a malfunction. However, especially with low volume pumping systems, many systems run at very low pressures. At such pressures and volumes, it is impractical to continuously test because insufficient pressures are developed to cause the necessary piston shiftings due to pressure differentials. Periodic testing at elevated pressures would be required. A system might normally operate at 25–50 psi. Some systems could be expected to operate at as low as 5–10 psi. A suitable test pressure would be on the order of 300 psi.

There has just been described a novel lubricant distribution system adaptable for use for continuous lubricant distribution, where an indication of a malfunction in the system can readily be obtained and the precise location of the malfunction can readily be ascertained.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

We claim:

1. A liquid distribution system comprising:
   a main liquid carrying pressure line; a supply of liquid under pressure communicating with said main pressure line;
   at least one liquid carrying branch pressure line for carrying liquid to a proportioning outlet, and a proportioning outlet at the end of said at least one branch line;
   connected into said branch line are a primary liquid flow control fitting and, downstream of said primary fitting, a secondary liquid flow control fitting, which fittings cooperate to apportion the flow rate of liquid to said proportioning outlet;
   valve means communicating with said branch line between said primary and said secondary fittings to be operated upon by the branch line pressure between said fittings; said valve means including first reacting means for reacting to a variation in the branch line pressure between said fittings;
   indicator means connected with said reacting means for indicating when said reacting means have reacted to a change in the aforesaid pressure.

2. A liquid distribution system comprising:
   a main liquid carrying pressure line; a supply of liquid under pressure communicating with said main pressure line;
   at least one liquid carrying branch pressure line for carrying liquid to a proportioning outlet, and a proportioning outlet at the end of said at least one branch line;
   connected into said branch line are a primary liquid flow control fitting and, downstream of said primary fitting, a secondary liquid flow control fitting, which fittings cooperate to apportion the flow rate of liquid to said proportioning outlet;
   valve means communicating on the one hand with said main line to be operated upon by the main line pressure and communicating on the other hand with said branch line between said primary and said secondary fittings to be operated upon by the branch line pressure between said fittings; said valve means including first reacting means for reacting to a variation in the branch line pressure between said fittings, in comparison to the main line pressure;
   indicator means connected with said reacting means for indicating when said reacting means have reacted to a change in the aforesaid comparative pressures.

3. The liquid distribution system of claim 2, wherein said secondary fitting is positioned near said proportioning outlet.

4. The liquid distribution system of claim 2, wherein said indicator means comprises a separate outlet from said main line;
   said reacting means comprises blocking means adapted to normally block said separate outlet; said blocking means being adapted to open said separate outlet based upon the comparative pressures in said main and said branch line when the difference in pressures exceeds a first threshold level and it is the branch line pressure that has decreased to bring about the variation.

5. The liquid distribution system of claim 2, wherein said valve means comprises first valve means and second valve means;
   said first valve means communicating on the one hand with said main line to be operated upon by the main line pressure and communicating on the other hand with said branch line between said primary and secondary fitting to be operated upon by the branch line pressure between said fittings; said reacting means being a part of said first valve means and reacting to a variation in the comparative pressures of said main and said branch lines when the difference in pressures exceeds the first threshold level and it is the branch line pressure that has decreased to bring about the variation;
   said second valve means communicating with said branch line between said fittings; said second valve means including second reacting means for reacting when the branch line pressure between said fittings exceeds a second threshold level;
   said indicator means also being connected with said second reacting means for indicating when said second reacting means has reacted to branch line pressure above the second threshold level.

6. The liquid distribution system of claim 5, wherein said indicating means comprises a separate outlet from said main line;
   said reacting means comprises blocking means adapted to normally block said separate outlet; said blocking means being adapted to open said separate outlet based upon the comparative pressures in said main and said branch line when the difference in pressures exceeds a first threshold level and it is the branch line pressure that has decreased to bring about the variation.

7. The liquid distribution system of claim 5, wherein said second valve means comprises a second shiftable spool, which is shiftable to increase the space for liquid in said branch line between said fittings;
   movement restraining means being connected to said second spool and adapted to prevent shifting of that spool until said second threshold level of pressure in said branch line between said fittings is exceeded.

8. The liquid distribution system of claim 5, wherein said primary fitting, said first valve means, a portion of said main pressure line, including a connection between said main pressure line and said branch line, and said indicator means are all incorporated within a unitary proportioning block.

9. The liquid distribution system of claim 2, wherein said valve means includes first valve means, which comprises a first shiftable spool; on one operative surface, said first spool is exposed to the main line pressure, which would cause said first spool to move in a first direction; on a second operative surface, said first spool is exposed to the branch line pressure between said primary and said secondary fittings, which branch line pressure would cause said first spool to move in the direction opposite said first direction;

said reacting means being part of said first valve means and being positioned to be acted upon and thereby to react to the movement of said first spool.

10. The liquid distribution system of claim 9, further comprising a biasing means connected with so as to operate upon said first spool to bias said first spool in the said opposite direction.

11. The liquid distribution system of claim 9, wherein said reacting means comprises a separate outlet from said main line; and said first spool includes blocking means for blocking said separate outlet from said main line when said first spool is moved in said opposite direction; and for opening said separate outlet when said first spool is moved in said first direction, thereby permitting liquid to leak through said separate outlet.

12. The liquid distribution system of claim 11, wherein said valve means further comprises a second valve means;

said second valve means communicating with said branch line between said fittings; said second valve means including second reacting means for reacting when the branch line pressure between said fittings exceeds a second threshold level;

said indicator means also being connected with said second reacting means for indicating when said second reacting means has reacted to branch line pressure above the second threshold level.

13. The liquid distribution system of claim 12, wherein said second valve means comprises a second shiftable spool, which is shiftable to increase the space for liquid in said branch line between said fittings;

movement restraining means being connected to said second spool and adapted to prevent shifting of that spool until said second threshold level of pressure in said branch line between said fittings is exceeded.

14. The liquid distribution system of claim 13, wherein said restraining means comprises a shearable means with a burst strength selected to permit shifting of said second spool at the pressure exceeding said second threshold level.

15. The liquid distribution system of claim 13, further comprising a volume adjustment means connected with said branch line between said fittings for increasing the available space for liquid between said fittings when said first spool shifts in said first direction.

16. The liquid distribution system of claim 15, wherein said volume adjustment means comprises a third shiftable spool, which is spring biased to decrease the space between said fittings.

17. The liquid distribution system of claim 16, wherein said secondary fitting is positioned near said proportioning outlet from said branch line.

18. The liquid distribution system of claim 17, wherein said primary fitting, said first valve means, a portion of said main pressure line, including a connection between said main pressure line and said branch line, and said indicator means all incorporated within a unitary proportioning block.

19. The liquid distribution system of claim 18, comprising a pressure sensor and indicator communicating with said main pressure line for indicating particular variations in pressure in said main pressure line.

20. The liquid distribution system of claim 9, further comprising a volume adjustment means connected with said branch line between said fittings for increasing the available space for liquid between said fittings when said first spool shifts in said first direction.

* * * * *